March 9, 1926.

R. SCHABER

LOCKING DEVICE FOR AUTOMOBILE CUSHIONS

Filed Oct. 21, 1925

1,575,941

Inventor

R. Schaber

By Clarence A. O'Brien

Attorney

Patented Mar. 9, 1926.

1,575,941

UNITED STATES PATENT OFFICE.

RALPH SCHABER, OF DETROIT, MICHIGAN.

LOCKING DEVICE FOR AUTOMOBILE CUSHIONS.

Application filed October 21, 1925. Serial No. 63,926.

*To all whom it may concern:*

Be it known that I, RALPH SCHABER, a citizen of the United States, residing at Detroit, in the county of Wayne and State of Michigan, have invented certain new and useful Improvements in a Locking Device for Automobile Cushions, of which the following is a specification.

This invention relates to a highly novel and simple device for locking an automobile seat cushion on the seat supporting frame so as to prevent any unauthorized person removing the seat cushion as well as any tools or the like which may be placed underneath of the seat.

Ordinarily, automobile seat cushions are readily and easily removed from their supporting frames, and no means has heretofore been provided for locking the seat cushion on its supporting frame, and as a result seat cushions have been stolen as well as the tools or other articles which are normally covered by the seat cushions.

One of the important objects of my invention is to provide a seat cushion locking device which may be readily and easily actuated by any authorized person, the cushion being adapted to be locked when the driver leaves the automobile unattended.

A still further object is to provide a seat cushion locking device which is simple in construction, inexpensive, strong, and durable, and further well adapted to the purpose for which it is designed.

Other objects and advantages of the invention will become apparent during the course of the following description taken in connection with the accompanying drawing.

In the accompanying drawing forming part of this application wherein like numerals designate like parts throughout the same:

Figure 1:
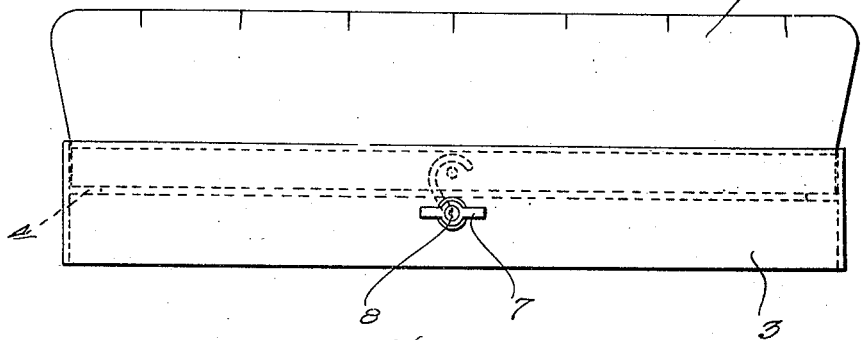
Figure 1 is a front elevation of an automobile seat cushion and its supporting frame showing my improved locking device associated therewith.
Figure 2:
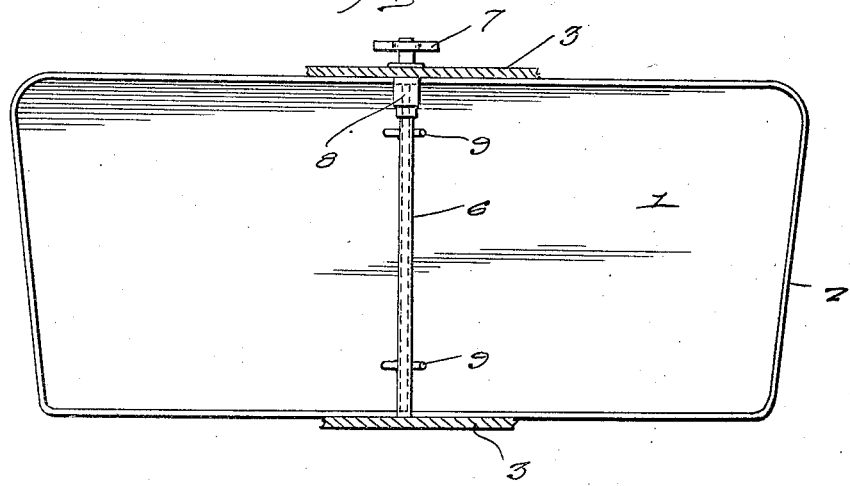
Figure 2 is a bottom plan view of the automobile seat cushion supporting frame and the locking means formed therein.

In the drawing, wherein for the purpose of illustration is shown the preferred embodiment of my invention, the numeral 1 designates generally an automobile seat cushion of the conventional construction, the same being provided with the usual reinforcing flange 2 around its bottom edge in a manner well known in the art. The supporting frame which is secured on the floor board of an automobile and is provided for supporting the seat cushion is illustrated generally at 3. The supporting frame is provided with the usual flanges 4 on which is adapted to rest the bottom edges of the depending flange 2 associated with the seat cushion in the manner clearly illustrated in Figure 3 whereby the seat cushion is properly supported in its frame.

Figure 3:
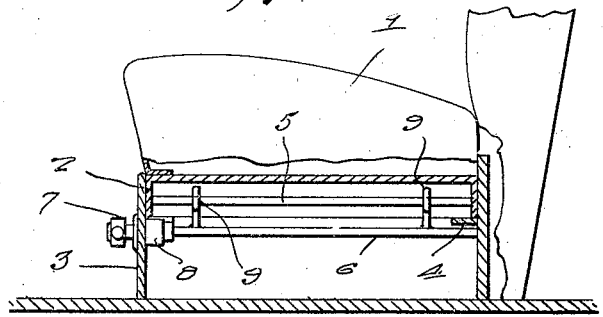
Figure 3 is a side elevation of the locking device, the parts of the automobile cushion seat and its supporting frame being disclosed in section to more clearly illustrate my invention.

My improved locking device is associated with the seat cushion and its supporting frame comprising a rod 5 which extends transversely between the front and rear side of the flange 2 at a point intermediate the ends of the seat cushion, and as is clearly illustrated in Figure 3, this rod is spaced from the bottom of the cushion.

Disposed directly below the rod 5 and in the same vertical plane therewith is the rotatable shaft 6. The rear end of this shaft is journaled in the rear wall of the seat cushion supporting frame 3 at the intermediate portion thereof and at a point directly below the ledge 4 as is clearly shown in Figure 3. The forward end of this shaft extends through the intermediate portion of the front wall of the seat supporting frame 3. An operating handle 7 is secured on the forward end of this shaft and also associated with the forward end of this shaft is a cylinder lock 8 of any conventional construction. A pair of upwardly disposed curved hooks 9 are formed on the shaft 6 adjacent the respective ends thereof, and these hooks are adapted to extend over the rod 5 for locking the seat cushion in its supporting frame against upward movement when the cylinder lock 8 has been locked.

When the parts are arranged as shown in the drawing, it will be impossible for any one to remove the seat cushion from the frame, thus enabling the driver of an automobile which is equipped with such locking means to leave the car without any danger of any unauthorized person removing the seat cushions as well as the tools or other articles placed underneath of the seat.

Whenever it becomes necessary to remove the seat cushions either for cleaning purposes, or to gain access to the tools or other articles placed beneath the seat, the proper key is inserted in the key slot provided therefor in the forward end of the cylinder lock for releasing the same and by actuating the handle 7 in one direction, the shaft 6 will be rotated so as to swing the hooks 9 laterally out of engagement with the upper rod 5, and when the parts are in this position, the seat cushions may then be readily and easily lifted upwardly from its supporting frame. After the seat cushion has been placed back in position on its frame, the shaft is again rotated whereby the hooks are swung upwardly over the rod 5 to the position shown in the drawing, and when the cylinder lock is in operative position, the hooks cannot be swung out of engagement with the rod, thereby insuring the safe locking of a seat cushion on its supporting frame.

The simplicity of my improved locking device enables the same to be readily and easily installed without necessitating material alterations of the seat cushions or the supporting frames therefor. Furthermore, a locking device of the above mentioned character will at all times be positive and efficient in carrying out the purpose for which it is designed.

While I have shown the preferred embodiment of my invention, it is to be understood that minor changes in the size, shape and arrangement of parts may be resorted to without departing from the spirit of the invention, and the scope of the appended claims.

Having thus described the invention, what I claim as new is:—

1. A lock for automobile seat cushions comprising a rod carried by the bottom of a seat cushion and spaced therefrom, a rotatable shaft mounted in the seat cushion supporting frame and being directly below said rod, and hooks formed on said shaft and adapted to extend over the rod for preventing the removal of the seat cushion from its supporting frame.

2. A lock for automobile seat cushions comprising a rod carried by the bottom of a seat cushion and spaced therefrom, a rotatable shaft mounted in the seat cushion supporting frame and being directly below said rod, hooks formed on said shaft and adapted to extend over the rod for preventing the removal of the seat cushion from its supporting frame, and a lock associated with said shaft for preventing the rotation thereof.

3. A lock for automobile seat cushions comprising a rod extending transversely between the intermediate portions of the front and rear sides of the bottom of the seat cushion and spaced therefrom, a transversely extending rotatable shaft, the rear end thereof being journaled in the intermediate portion of the rear wall of the seat cushion supporting frame, the forward end of said shaft extending through the front wall of said frame, hooks formed on the intermediate portion of the shaft adapted to extend over the rod to prevent the removal of the seat cushion from its supporting frame, and a handle on the forward end of the shaft for rotating the same whereby said rod may be swung to an inoperative position.

4. A lock for automobile seat cushions comprising a rod extending transversely between the intermediate portions of the front and rear sides of the bottom of the seat cushion and spaced therefrom, a transversely extending rotatable shaft, the rear end thereof being journaled in the intermediate portion of the rear wall of the seat cushion supporting frame, the forward end of said shaft extending through the front wall of said frame, hooks formed on the intermediate portion of the shaft adapted to extend over the rod to prevent the removal of the seat cushion from its supporting frame, a handle on the forward end of the shaft for rotating the same whereby said hooks may be swung to an inoperative position, and a lock associated with the forward end of the shaft for preventing the rotation thereof and holding the hooks in position over the rod.

In testimony whereof I affix my signature.

RALPH SCHABER.